United States Patent
Zimmerman

(10) Patent No.: US 6,650,320 B1
(45) Date of Patent: Nov. 18, 2003

(54) DIGITAL PEN USING VISIBLE IMAGE AND AUTOCORRELATION OF SUBSTRATE PATTERN

(75) Inventor: Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 09/640,133

(22) Filed: Aug. 16, 2000

(51) Int. Cl.⁷ .................................................. G09G 5/00
(52) U.S. Cl. ........................................ 345/179; 345/158
(58) Field of Search ................................ 345/179, 183, 345/166; 178/18.01, 18.03, 18.05, 19.01, 19.04, 19.05

(56) References Cited

U.S. PATENT DOCUMENTS

| | | | | |
|---|---|---|---|---|
| 4,947,261 A | * | 8/1990 | Ishikawa et al. | 358/471 |
| 4,958,378 A | * | 9/1990 | Bell | 382/222 |
| 5,477,012 A | * | 12/1995 | Sekendur | 178/18.09 |
| 5,652,412 A | | 7/1997 | Lazzouni et al. | 178/18 |
| 5,661,506 A | | 8/1997 | Lazzouni et al. | 345/179 |
| 5,748,808 A | * | 5/1998 | Taguchi et al. | 382/312 |
| 5,786,804 A | * | 7/1998 | Gordon | 345/158 |
| 5,852,434 A | * | 12/1998 | Sekendur | 178/18.01 |
| 6,151,015 A | * | 11/2000 | Badyal et al. | 345/179 |
| 6,281,882 B1 | * | 8/2001 | Gordon et al. | 345/158 |

* cited by examiner

Primary Examiner—Richard Hjerpe
Assistant Examiner—Alexander Eisen
(74) Attorney, Agent, or Firm—John L. Rogitz

(57) ABSTRACT

A digital pen that has an ink writing tip includes a light source on a pen body that directs light toward paper across which the writing tip is stroked. A CMOS camera or CCD is also mounted on the pen body for detecting reflections of the light. A processor in the pen body determines relative pen motion based on the reflections. A contact sensor such as an FSR on the pen body senses when the tip is pressed against the paper, with positions being recorded on a non-volatile memory in the pen body only when the contact sensor indicates that the pen is against the paper. Periodically, key frames are stored in memory but not for every cycle. The memory can be later engaged with a handwriting recognition device, such as a PC, to correlate the key frames and positions to alpha-numeric characters. Ordinary paper or quad-ruled paper can be used, and, if desired, special bar-coded paper can also be used, so that the PC can determine absolute pen position.

30 Claims, 4 Drawing Sheets

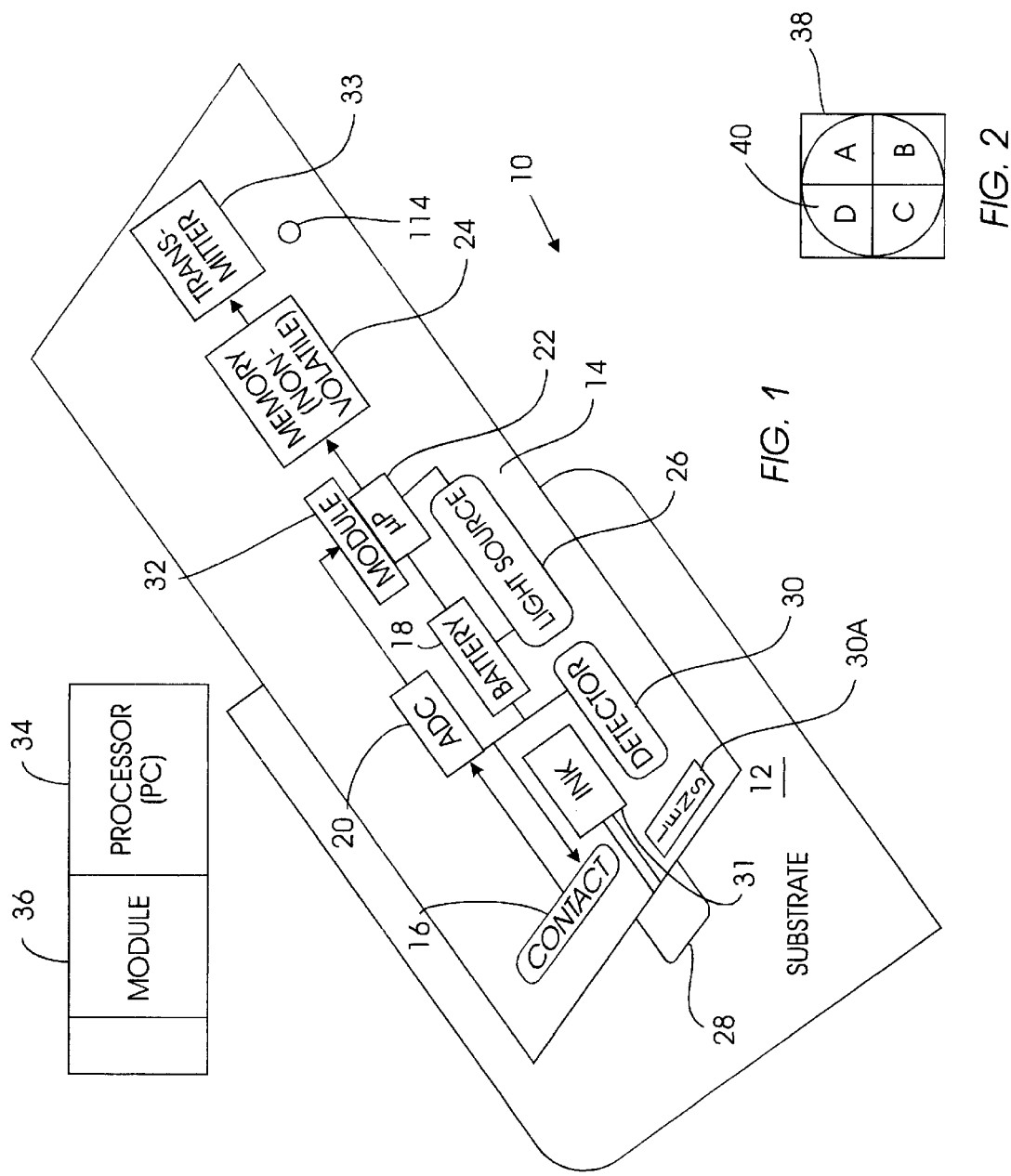

DIGITAL PEN USING VISIBLE IMAGE AND AUTOCORRELATION OF SUBSTRATE PATTERN

BACKGROUND OF THE INVENTION

1. Field of the Invention

The present invention relates generally to handwriting data entry, and more particularly to methods and systems for facilitating data entry using a pen input device.

2. Description of the Related Art

Digital writing instruments, interchangeably referred to herein as "digital pens" regardless of whether they write in ink, can be used to capture pen strokes on paper and digitize them, so that the pen strokes can be converted by handwriting recognition software to a digitally-stored record of the writing. In this way, a laborious, tedious step in modern written communication, namely, the manual transcribing of handwriting into a computerized word processor, is eliminated, greatly increasing productivity.

Accordingly, digital pen systems can digitize pen strokes across a substrate, by sensing, in some fashion, the time-dependent position of the pen and converting the positions to pen strokes, for input of digital representations of the pen strokes to a handwriting recognition device. As recognized herein, many previous systems require special pads to sense pen or stylus motion. As further recognized herein, it is desirable to enable a writer to write characters on a conventional paper substrate while recording pen motion without requiring the use of a special underlying pad, so that the user can write on any paper substrate without having to transport and use a relatively bulky pad. The present invention moreover recognizes that it is desirable to provide a system that can, but not must, use special paper for particular applications.

In the present inventor's and present assignee's co-pending U.S. patent application Ser. No. 09/557,579, filed Apr. 22, 2000, a digital pen device is disclosed in which a laser is mounted on the pen to direct coherent light against a paper substrate. Reflected interference patterns, referred to as speckles, are imaged and processed to determine relative pen movements. Special (bar-coded) paper can be used to anchor the relative pen movements to absolute locations. The present invention seeks to extend the principles disclosed in the '579 application to providing a pen that uses non-coherent light for facilitating use of a single pen with plain paper, quad paper, and special paper having any one of a number of bar code schemes, without requiring the relatively small processor of the pen to know the particular kind of paper being used or to know any particular bar code pattern when special paper is used.

A "memo pen" is disclosed by Nabeshima et al. in CHI '95 Proceedings. The "memo-pen" is an ordinary pen with the exception that is takes images of what it draws and then "stitches" the images together to produce a mosaic of the paper. As recognized by the present invention, the device of Nabeshima et al. requires taking and saving to memory a full image each processing cycle, with the relatively large number of images saved to onboard non-volatile memory in turn dictating that each image size be relatively small. Even so, according to Nabeshima et al. so much memory is consumed that only about fifteen minutes of handwriting can be stored in the pen. The present invention recognizes the above-stated drawbacks, and furthermore recognizes the desirability of providing a pen that can image bar-coded paper without requiring the pen to know any bar codes, thus enabling the use of a relatively simple, low cost pen input device.

SUMMARY OF THE INVENTION

A digital pen includes an elongated body defining a writing tip. A light source is oriented on the body to direct light onto a substrate against which the writing tip can be positioned to deposit a substance thereon. Also, a detector receives reflections of light from the substrate, and a pen processor receives signals from the detector and in response thereto outputs delta signals that represent differences between successive positions of the pen. The processor does this by executing a bitwise XOR of a current frame of pixels against a previous frame of pixels at plural potential positions, with a delta position being based on the potential position having a highest XOR sum. Consequently, each and every frame image need not be saved to non-volatile memory onboard the pen.

In a preferred embodiment, the reflections detected by the detector are from the substance or by the substrate. Also, a non-volatile memory is supported by the body, and the memory stores signals from the pen processor. The signals can be retrieved from the memory and processed by a handwriting recognition module to render signals representing alpha-numeric characters.

As disclosed in detail below, a contact sensor preferably is supported by the body. The contact sensor outputs a contact signal representative of whether the writing tip is positioned against the substrate. The pen processor selectively sends delta signals to the memory based at least in part on the contact signal.

In addition to generating delta signals, the pen processor periodically stores key frames. Each key frame is an image of the substrate. In greater detail, the pen processor has a local memory, and when a confidence threshold is reached as defined by a comparison between the current frame and last frame, a delta signal is stored in the non-volatile memory when the contact signal indicates the writing tip is positioned against the substrate. Otherwise, the delta signal is temporarily stored in the local memory of the pen processor. When the contact signal indicates the writing tip is positioned against the substrate and the confidence threshold is reached, a delta signal is generated every cycle and a key frame is imaged and stored only once every "N" cycles, wherein "N" is an integer greater than one. In contrast, when the contact signal indicates the writing tip is positioned against the substrate and the confidence threshold is not reached for a low confidence cycle, a key frame is imaged and stored for the low confidence cycle. In addition, a key frame is imaged and stored each time the pen is lifted and placed on the substrate. In the presently preferred embodiment, a host processor receives signals from the pen processor and accesses a library of optical patterns to determine a type of optical pattern on the substrate.

In another aspect, a digital input device includes an elongated body defining a distal tip configured for depositing a substance onto a substrate, and a light source oriented on the body to direct light toward the vicinity of the distal tip. The device also includes a detector oriented on the body to receive reflections of light source light from a substrate against which the distal from time to time can be positioned. A contact sensor is on the body, and a pen processor is also supported by the body. The processor communicates with the detector and the contact sensor to determine, each cycle period, whether to generate delta signals and to store in non-volatile memory onboard the body each update period greater than a cycle period, a key frame image of the substrate.

In still another aspect, a computer-implemented method for digitizing strokes of a writing tip across a substrate includes detecting reflections from a substrate each cycle period, and comparing a frame of reflected light in a second cycle to a frame of reflected light in a first cycle immediately preceding the second cycle to generate a delta signal. The method also includes occasionally but not every cycle generating at least one key frame, and storing the key frames and selectively storing delta signals in non-volatile memory in a pen body associated with the writing tip. The key frames and delta signals are transferred to a host processor, which is used to correlate the delta signals and key frames to alpha-numeric characters.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic view of the pen input system of the present invention;

FIG. 2 is a schematic view of a program storage device;

DETAILED DESCRIPTION OF THE PREFERRED EMBODIMENTS

Figure 3:
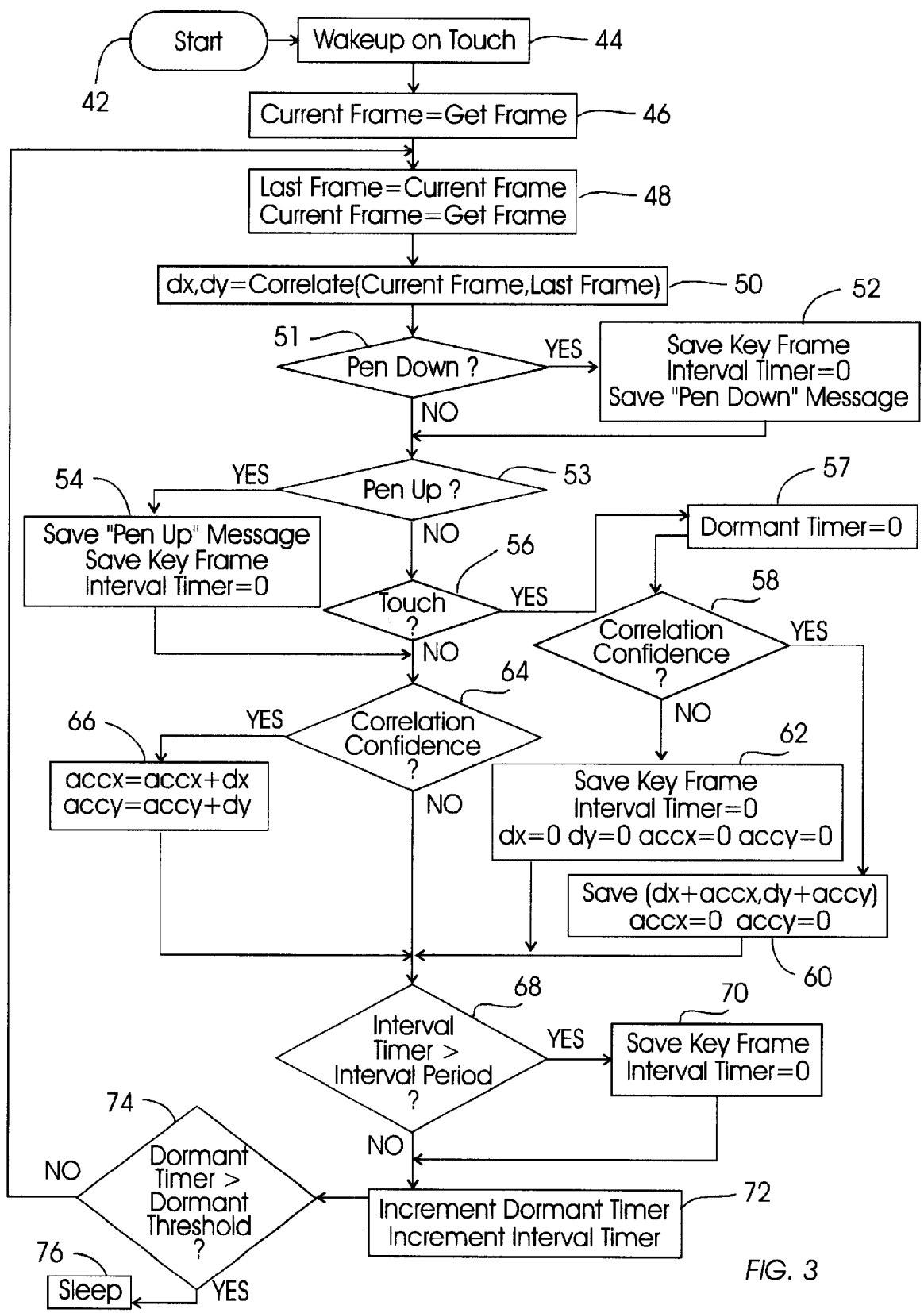
FIG. 3 is a flow chart showing the overall logic by which pen position signals are generated based on movement of a pen across the substrate.

Referring initially to FIG. 1, a pen input device is shown, generally designated 10, which includes a substrate 12 and at least one lightweight elongated hollow plastic or metal pen body 14. The preferred embodiment set forth herein contemplates a pen body 14 that can be manipulated by a writer to write ink or graphite or other substance onto a substrate 12 such as paper, while digitally recording strokes across the substrate 12. It is to be understood, however, that the principles advanced herein can be used with a pen body 14 that is a stylus-type device that does not necessarily deposit ink or other substance onto a substrate, or even a pen body that is not elongated but rather can have any suitable manipulable shape, such as that of a computer mouse.

A contact sensor 16 can be supported on the pen body 14, for purposes to be shortly disclosed. The contact sensor can include, e.g., force sensing resistors or other force sensors. The contact sensor is energized by a dc power supply 18, preferably a type AAA Nickel Metal Hydride rechargeable battery with voltage step-up electronics, with the signals from the contact sensor 16 being sent to an analog to digital converter (ADC) 20. Or, the power supply 18 could be an alkaline battery or other equivalent source. Digitized signals from the ADC 20 are sent to a digital processor 22, which selectively stores pen position information in a non-volatile memory 24. Signals stored in the memory 24 indicate the position of the tip 28, such that the signals can be transferred to a PC-based handwriting recognition engine for converting the position signals to alpha-numeric characters and graphical representations. The handwriting recognition engine can be any suitable handwriting recognition system, such as those disclosed in U.S. Pat. Nos. 5,644,652, 5,343,537, or 5,550,931, all owned by the present assignee and all incorporated herein by reference. The power supply 18, ADC 20, processor 22, and memory 24 are all mounted on the pen body 14 as shown.

In accordance with the present invention, the power supply 18 also energizes a light source 26 that is mounted on the body 14. Preferably, the light source 26 is a source of non-coherent infrared or visible light. As can be appreciated in reference to FIG. 1, the light source 26 is oriented on the body 14 such that it directs light toward the vicinity of a distal writing tip 28 of the pen body 14. As contemplated hereunder, the reflections of the light off the substrate 12 are detected by a detector 30, also mounted, in the preferred embodiment, on the body 14. In the preferred embodiment the detector 30 is a CMOS imaging sensor array or CCD having associated lens 30a. The signal from the detector 30 is digitized by the ADC 20 or by a separate ADC (not shown), with the digitized signal then being sent to the processor 22.

In continued reference to FIG. 1, in the preferred embodiment ink is deposited on the substrate 12 as the writing tip 28 is moved against the substrate 12. Accordingly, an ink supply 31 is mounted on the body 14 in communication with the writing tip 28. Alternatively, the writing tip 28 can deposit graphite or other substance on the substrate 12.

In one preferred embodiment, the detector 30 is a Mitsubishi M64282FP Image Sensor with a window of 128×128 pixels, the memory 24 is a four megabyte flash memory chip, and the processor 22 is a Texas Instruments MSP430× 11×1 processor chip.

In accordance with the present invention, the processor 22 accesses a software or firmware position module 32 to correlate the signals from the ADC 20 to position signals representative of the position of the writing tip 28 relative to the substrate 12. These signals are then compressed by run length encoding, stored in the memory 24, and then transmitted by a preferably wireless transmitter 33 to a handwriting recognition engine such as the ones mentioned above for reduction of the position signals to alpha-numeric characters. The handwriting recognition module can reside in a computer-based host processor 34 that accesses a module 36 for undertaking portions of the logic described below, such that the processor 22 onboard the present pen need not be burdened with recognizing potentially dozens of possible changing bar codes. As used herein, "bar codes" refers to any visible or invisible (infrared-visible) combinations of marks, including dots and lines, that convey digital information.

It is to be understood that the processors of the present invention can be a general purpose computer appropriate for its intended function and programmed to undertake appropriate method steps set forth herein. For example, the processor 22 can be a digital signal processor such as Analog Devices ADSP2104L, or a field programmable logic array such as a Xilinx XC2S39, or an ASIC, while the processor 34 can be an Intel microprocessor as might be found in a personal computer or laptop or palmtop computer. The processor 22/module 32/memory 24 can be linked to the processor 34 by radio waves such as are used in the system known as "Bluetooth", ultrasonic waves, IR link, or other remote means. Or, the module 32 can be incorporated into the processor 34 in a desktop computer, laptop computer such as a Thinkpad® made by International Business Machines Corporation (IBM) of Armonk, N.Y., or a personal digital assistant such as a 3COM Palm Pilot®, or a video game such as a Sony Playstation or Sega Dreamcast®.

It is to be further understood that the control components such as the module 32 are executed by logic components such as are embodied in logic circuits on, e.g., an ASIC chip, or in software contained in an appropriate electronic data storage, e.g., random access memory (RAM), or hard disk drive and/or optical disk drive, or DASD array, magnetic tape, electronic read-only memory, or other appropriate data storage device that is conventionally coupled to the processor 22 for executing the module 32. For example, the control components can be embodied in a computer program product 38, such as a flash memory. The computer program product 38 shown in FIG. 2 has a computer usable medium 40 on which are stored computer readable code means (i.e., program code elements) A–D.

The flow charts herein illustrate the structure of the present logic. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. In other words, the module 32 may be a computer program that is embodied in software or firmware and that is executed by a processor as a series of computer-executable instructions. In an illustrative embodiment of the invention, the computer-executable instructions may be lines of compiled C compatible code.

FIG. 3 shows the computer-implemented method of the present invention that in a preferred embodiment would run in the microprocessor 22 in the pen input device 10. Commencing at start state 42, the logic moves to block 44 to wake up, i.e., enable the remaining steps of the logic, upon touching the pen to the substrate as indicated by the contact sensor 16. Proceeding to block 46, the current frame is initialized to a first get frame, and then at block 48 the last frame is set equal to the current frame. Also at block 48 the current frame is set equal to the next (subsequent) frame, i.e., the frame following the first get frame for the first cycle, then the next frame for the second cycle, and so on.

Moving to block 50, the difference in the x- and y-dimensions between the centers of the current and last frames is determined as set forth further below in reference to FIG. 4. Then, at decision diamond 51 it is determined whether the pen, if it was not in contact with the substrate during the last frame, has just touched the substrate during the current frame as indicated by the signals from the contact sensor 16. If so, a new touch is indicated, and the logic saves the entire image of the frame as a key frame to the onboard memory 24 at block 52. Also at block 52, an interval timer is set equal to zero. Additionally, a "pen down" message is timestamped and saved to the onboard memory 24 at block 52.

If the test at decision diamond 51 is negative the logic proceeds to decision diamond 53 to undertake the opposite test, i.e., to determine whether, if the pen had been in contact with the substrate during the preceding cycle, it is now no longer in contact. If this test is positive the logic saves a "pen up" message along with time stamp, and saves the entire image of the frame to memory, at block 54. Also at block 54 the interval timer is set equal to zero. In a preferred embodiment the image is saved in compressed format, such as run-length encoding, to conserve memory space.

When no new "pen up" event has occurred as determined at decision diamond 53, and from block 52, the logic moves to decision diamond 56 to determine whether the pen is touching the substrate. Of course, for a positive test at decision diamond 53, the test at decision diamond 56 is omitted, so that the logic flow from block 54 bypasses decision diamond 56.

When the pen is touching the substrate, the logic moves to block 57 to re-zero a dormant timer, and then to decision diamond 58. At decision diamond 58 it is determined whether a correlation confidence threshold is met between the current and last frames. For instance, the threshold can be set at a predetermined bit sum. If the correlation confidence threshold has been met, the logic moves to block 60 to save the following parameters to onboard memory. The delta x and delta y values from block 50 are added to respective accumulated delta x and delta y bins and saved to onboard memory. Then, the accumulated delta x and delta y bins are emptied, i.e., are set equal to zero. In contrast, if the correlation confidence threshold has not been met, the logic moves from decision diamond 58 to block 62 to save an entire frame image, designated herein as a "key frame", in onboard memory 24.

On the other hand, when it is determined at decision diamond 56 that the pen is not touching the substrate, the logic moves to decision diamond 64. At decision diamond 64 it is determined whether a correlation confidence threshold is met between the current and last frames. If so, the logic moves to block 66 to add the delta x and delta y values from block 50 to respective accumulated delta x and delta y bins, with the new accumulated sum not being saved in the onboard non-volatile memory 24 but rather in temporary processor 22 storage. In contrast, if the correlation confidence threshold has not been met at decision diamond 64, and from blocks 60, 62, and 66, the logic moves to decision diamond 68.

At decision diamond 68, it is determined whether the interval timer has timed out. The interval timer can time out after a period of, e.g., one second. If it has, the logic moves to block 70 to save a key frame and re-zero the interval timer. From decision diamond 68 after a negative test or from block 70, the logic proceeds to block 72 to increment the dormant timer and to increment the interval timer. Next, it is determined at decision diamond 74 whether the dormant timer has exceeded its threshold, i.e., whether the pen has not touched the substrate for longer than a predetermined period, and if so the current logic enters a "sleep" state at block 76 until the next touch is sensed. Otherwise, the logic loops back to block 48.

With the above in mind, it can now be appreciated that key frames or other frame images are not saved each cycle through the logic shown in FIG. 3 in the onboard memory 24. Rather, key frames are stored only once each "n" cycles, wherein "n" is an integer greater than one and preferably much greater than one, or upon low correlation between immediately cyclically successive frames, or upon the first touch and last touch of the pen to the substrate. Between key frames, only delta position data is saved, and the accumulated delta is saved in non-volatile memory 24 only when the pen is touching the substrate. Otherwise, the delta is tracked in local processor 22 memory. It may be further appreciated that as a consequence, a comparatively small amount of data need be saved in the relatively small onboard memory 24 for subsequently downloading the data to a host processor 34 to digitally capture the handwriting, thereby permitting a person to write a relatively long time without having to download.

Figure 4:
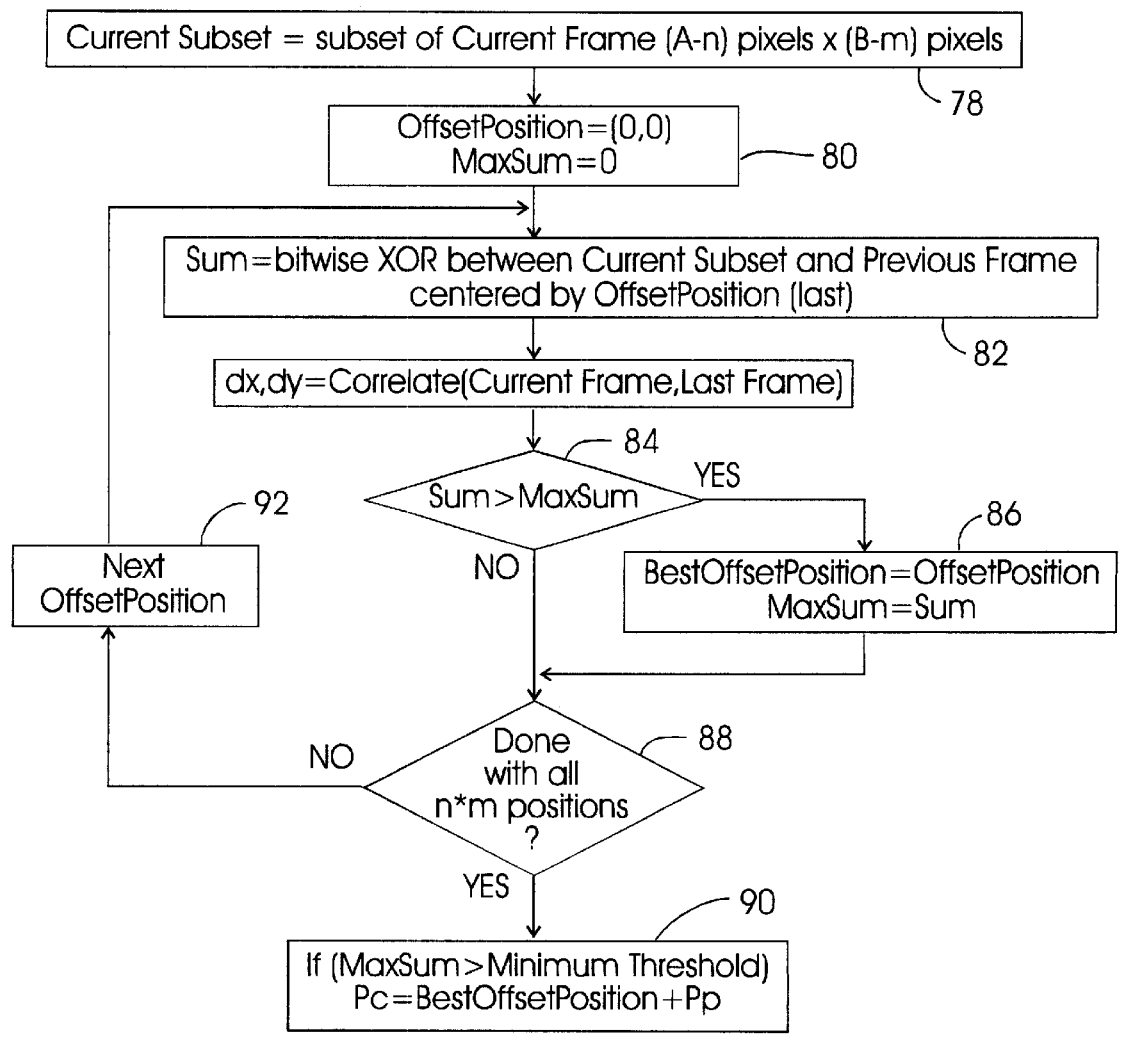
FIG. 4 is a flow chart showing the details of the preferred position logic.

FIG. 4 shows the details of the position comparison logic referred to above for determining the x- and y-deltas. Commencing at block 78, a subset of the current frame is established having dimensions (A−n)×(B−m). In the preferred embodiment, A and B are equal to forty (40), n and m are equal to eight (8), and the center of the current frame subset is superimposed on the center of the previous frame, such that the previous frame overlaps the current frame subset by four pixels at each edge.

To speed processing time the previous frame size can be less than the full camera footprint, and the current frame subset is smaller than the previous frame. It will be appreciated in reference to FIG. 4 that when the previous frame is 40×40 pixels and the current frame subset is 32×32 pixels, there are 64 possible pixels of the previous frame on which the current frame can be placed without falling outside the boundary of the previous frame. Stated another way, the center of the current frame subset can be offset to one of 64 positions and still completely overlap the previous frame.

With this explanation in mind, the logic moves from block 78 to block 80, wherein for potentially each of the possible sixty four offset positions a DO loop is entered. It is to be understood that for the current frame the brightness level of each pixel is converted to a binary value, in a preferred embodiment, by comparing the pixel brightness level to the average brightness level of pixels occurring in a row.

At block 82, the correlation of the previous frame to the current frame subset is calculated as the sum of the bitwise XOR between the binary values of the pixels of the previous frame and the current frame subset, wherein the center of the current frame subset is offset by the variable OffsetPosition. The variable OffsetPosition moves the current frame subset through each of the possible n*m positions, starting at (0,0) in block 80 and ending with (n,m), tested at decision diamond 88. As can be appreciated in reference to FIG. 4, decision diamond 84 and block 86 cooperate to save the OffsetPosition of the best correlation (the best match), identified by the largest sum. A perfect sum for a 32×32 matrix would be a value of 1,024, and one preferred minimum threshold could be, e.g. 973, representing a 95% bitwise correlation. Other values can be selected if desired. The confidence of the correlation is saved as the Maxsum.

If the sum exceeds an acceptable threshold, tested in block 90, the OffsetPosition for the greatest sum determined in block 86 is saved as the incremental movement of the pen tip 28 from the previous frame. This Offset is referred to above as the "delta" between the frames. It is to be appreciated that only the difference between frames in the x and y dimensions (and/or the accumulated difference) need be saved. Once the deltas are determined between temporally sequential frames, the frames themselves can be flushed from the local memory of the processor 22, unless a key frame is to be saved to non-volatile memory in accordance with the disclosure above. Block 92 simply shows the DO loop returning to block 82 when all positions have not yet been tested.

An extrapolated pen velocity can be determined using the delta and the time between cycles to realize processing efficiencies. Specifically, the position of the current frame can be extrapolated prior to executing the bitwise XOR logic by multiplying the velocity by the time between frames to render a distance differential, and then applying the distance differential to the previous frame position to render a extrapolated current frame position. The process beginning at block 80 can then be started commencing at the projected current frame position. Advantageously, this puts the current frame subset in the neighborhood of highest correlation, since the frame rate (typically 100 Hz or greater) is greater than the rate of change of pen movement (typical under 10 Hz). A benefit is not all n*m correlation calculations need to be performed. Because the current frame subset in the neighborhood of highest correlation, the loop can work a pattern that spirals out from the extrapolated position and decide on a correlation that both exceed the threshold and is a local maxima.

Figure 5:
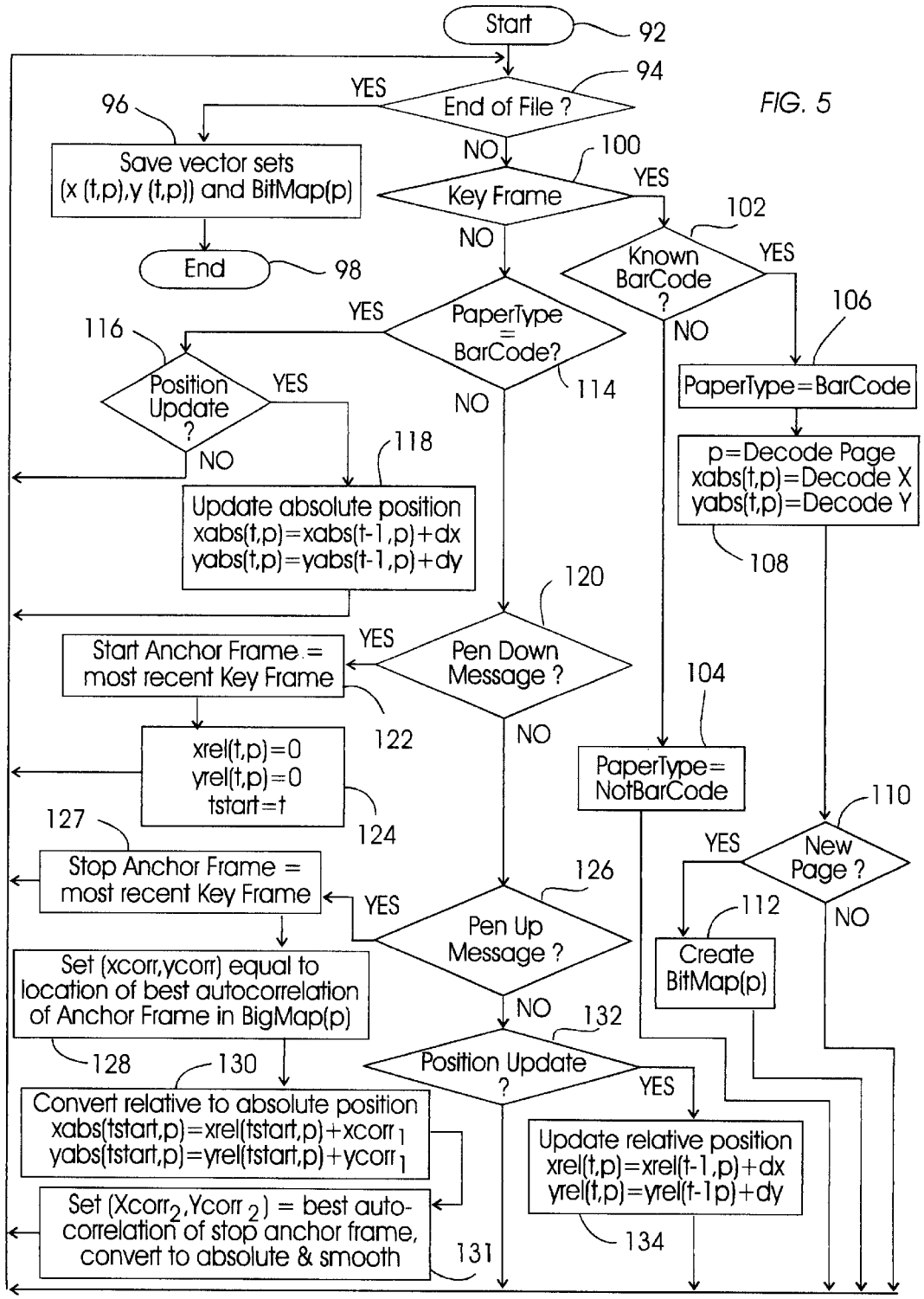
FIG. 5 is a flow chart of the logic of the host processor.

Now referring to FIG. 5, the logic of the host processor 34 can be seen. The logic starts at state 92 and proceeds to decision diamond 94 to determine whether the end of a file downloaded from the pen has been reached. If so, the time-sequenced vector sets of pen positions (either absolute or relative, as described further below depending on whether bar-coded paper is used) and bitmaps (if any) of bar-coded pages as generated by the process described below are saved at block 96, for subsequent input to a handwriting recognition module. The process then ends at state 98.

When the entire file has not yet been processed, the logic moves from decision diamond 94 to decision diamond 100 to determine whether a key frame is being processed. If so, the logic moves to decision diamond 102 to determine whether a known bar code has been imaged in the key frame being processed. To make this determination, the host processor can access a library of bar codes. Thus, the device 10 enables use of a pen with bar codes, without having to update or reprogram the pen every time a new bar code is introduced and without otherwise requiring the pen to know any bar codes. If no known bar codes are sensed the logic returns "paper type is not bar-coded" at block 104, and then the logic loops back top decision diamond 94.

On the other hand, when a known bar code is sensed, the logic moves from decision diamond 102 to block 106 to return "paper type is bar-coded". Then, the process moves to block 108, wherein the frame under test for which it is desired to decode the bar codes is associated with a page variable "p", and the absolute x- and y-positions are obtained by decoding the bar codes. These absolute positions establish the vector sets that are processed at block 96 above. If the page is determined not to be a new page at decision diamond 110, the logic loops back to decision diamond 94; otherwise, a new page "p" bitmap(p) is created at block 112, and then the logic returns to decision diamond 94.

Returning back to decision diamond 100, when it is determined that a key frame is not being processed the logic moves to decision diamond 114 to determine whether a known bar code has been imaged. When a known bar code is sensed, the logic moves to decision diamond 116 to determine whether a pen position update as indicated by bar codes is being processed. If it is, the absolute x- and y-positions are updated by adding the deltas to the existing absolute x- and y-positions at block 118. Recall that the pen positions are absolute positions relative to the page under test in the case of bar-coded substrate 12. From block 118 or from decision diamond 116 if the test there was negative (as might occur when, for example, the pen had been lifted off the substrate during the cycle being processed), the logic returns to decision diamond 94.

In the case where it is determined that a key frame of a non-bar-coded substrate is not being processed, the logic proceeds to decision diamond 120 to determine whether the pen command being processed includes a "pen down" message, as described earlier with respect to FIG. 3. If so, the logic moves to block 122 to define an anchor frame to be the most recently processed key frame, and then to block 124 to re-zero relative (delta) position holders and initialize a variable "$t_{start}$" to the time of the timestamp of the "pen down" message. The logic then returns to decision diamond 94.

If a "pen down" message is not part of the current command, the logic proceeds from decision diamond 120 to decision diamond 126 to determine whether a "pen up" signal is being processed. If it is, indicating the end of a handwriting stroke, the logic moves to block 128 to set correlation coordinates $x_{corr1}$ and $Y_{corr1}$ equal to the center location of the best correlation of the anchor frame defined in block 122 in the bitmap(p) created at block 112. Then, at block 130 the relative pen position is converted to an absolute position (relative to the position of the pen at the "pen down" command) by adding the correlation coordinates to the relative pen position coordinates that have been accumulated from the time $t_{start}$ of the "pen down" command. The absolute position at the end point of the vector ($X_{corr2}$, $Y_{corr2}$) is determined in block 131 as the best autocorrelation of Stop Anchor Frame. The absolute position of the vector elements between ($X_{corr1}$, $Y_{corr1}$) and ($X_{corr2}$, $Y_{corr2}$) are smoothed by a function such as a spline. This establishes a vector set for further processing at block 96. The file processing is complete at state 98. The resulting vector set file is a digital representation of the writing input. The file can be further processed and presented as a bitmap or vector drawing to the user, or converted to alpha-numeric character representation by handwriting recognition methods known in the art.

If a "pen up" signal is not part of the current cycle, the logic moves from diamond 126 to decision diamond 132, wherein it is determined whether a position update is indicated by the command under test, i.e., whether the above-mentioned deltas are being processed. If so, the logic moves to block 134 to update the relative pen position by adding the deltas to the respective accumulated relative pen positions in the x- and y-dimensions from the previous cycles since the time $t_{start}$ of the "pen down" signal. The logic then loops back to decision diamond 94.

It may now be appreciated that no special paper or underlying pad need be used with the device 10. That is, the substrate 12 can be a plain piece of paper or a quad-ruled piece of paper, in which case the quad lines serve as trackable features distributed all over the substrate 12 to improve correlation. Only a special pen device 10 is required to achieve digital input by storing positions in the memory 24 and later downloading data in the memory 24 to a handwriting recognition module.

Nonetheless, the present invention also envisions use of special paper to add further functionality. By "special paper" is meant a substrate that has been preprinted with bar codes in invisible, IR-absorbing ink or in visible ink. The term "bar code" is a generic term for optical marks on a substrate that spatially encode digital information. The optical marks absorb, reflect, fluoresce or alter the polarization of light that is detected by a detector which converts light intensity and/or polarization into an electrical signal to be processed and decoded into digital information. The bar codes can be lines or dots, squares, rectangles, or other geometric shapes, shades, or marks that are arranged to uniquely identify an absolute position in Cartesian coordinates on the substrate each quarter inch, along with a page number and, in the case of forms, a field location. Exemplary bar codes include Code 128, Universal Product Code (UPS), Code 39, Code 93, PDF417 designed by Symbol Technology, MaxiCode used by United Parcel Service, and Snowflake code from Electronic Automation Limited and Marconi Data Systems.

While the particular DIGITAL PEN USING VISIBLE IMAGE AND AUTOCORRELATION OF SUBSTRATE PATTERN as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited. All structural and functional equivalents to the elements of the above-described preferred embodiment that are known to those of ordinary skill in the art are expressly incorporated herein by reference and are intended to be encompassed by the present claims. As one non-limiting example, any logic that records handwriting data in a non-volatile memory onboard a pen by selectively saving only delta data for each cycle and not saving entire image frames for each and every cycle is intended to be covered hereunder. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

I claim:

1. A digital pen, comprising:
   an elongated body defining a writing tip;
   a light source oriented on the body to direct light onto a substrate against which the writing tip can be positioned to deposit a substance thereon;
   a contact sensor generating a contact signal when the writing tip abuts a surface;
   a detector receiving reflections of light from the substrate; and
   a pen processor receiving signals from the detector and in response thereto outputting delta signals representative of differences between successive positions of the pen by executing a bitwise XOR of at least a subset of a current frame of pixels against a previous frame of pixels at plural potential positions, a delta position being based on the potential position having a highest XOR sum, wherein when the contact signal indicates the writing tip is positioned against the substrate and a confidence threshold is reached, a delta signal is generated every cycle and a key frame is imaged and stored only once every "N" cycles, wherein "N" is an integer greater than one, wherein the pen processor has a local memory and wherein when a confidence threshold is reached as defined by a comparison between the current frame and last frame, a delta signal is stored in a memory supported by the body when the contact signal indicates the body is positioned against the substrate, and otherwise the delta signal is stored in the local memory of the pen processor.

2. The device of claim 1, wherein at least some of the light detected by the detector is from the substance.

3. The device of claim 2, wherein at least some of the light detected by the detector is from an optical code on the substrate.

4. The device of claim 1, wherein the memory supported by the body stores signals from the pen processor, whereby the signals can be retrieved from the memory supported by the pen body and processed to digitally represent writing input.

5. The device of claim 4, further comprising a contact sensor supported by the body, the contact sensor outputting a contact signal representative of whether the body is positioned against the substrate, wherein the pen processor selectively sends delta signals to the memory supported by the body based at least in part on the contact signal.

6. The device of claim 3, wherein the optical codes detectable by the detector represent at least positions, the detector outputting at least one code signal in response to detecting an optical code for determining an absolute position of the body.

7. The device of claim 5, wherein in addition to generating delta signals, the pen processor periodically stores key frames, each key frame being an image of the substrate.

8. The device of claim 1, wherein when the contact signal indicates the body is positioned against the substrate and the confidence threshold is not related for a low confidence cycle, a key frame is imaged and stored in memory supported by the body for the low confidence cycle.

9. The device of claim 1, further comprising a host processor receiving signals from the pen processor and accessing a library of optical patterns to determine a type of optical pattern on the substrate.

10. A digital input device, comprising:
an elongated body defining a distal tip configured for depositing a substance onto a substrate;
at least one light source oriented on the body to direct light toward the vicinity of the distal tip;
at least one detector oriented on the body to receive light from a substrate against which the distal from time to time can be positioned;
at least one contact sensor on the body; and
at least one pen processor on the body, the processor communicating with the detector and the contact sensor to determine, each cycle period, whether to generate delta signals and to store in memory onboard the body, each update period greater than a cycle period, a key frame image of the substrate, wherein the pen processor has a local memory and wherein when a confidence threshold is reached as defined by a comparison between a current frame and a last frame, a delta signal is stored in the memory onboard the body when the contact signal indicates the writing tip is positioned against the substrate, and otherwise the delta signal is stored in the local memory of the pen processor.

11. The device of claim 10, wherein delta signals are generated by the pen processor, the delta signals representing differences between successive positions of the distal tip, the pen processor generating a delta signal by executing a bitwise XOR of at least a subset of a current frame of pixels against a previous frame of pixels at plural potential positions, a delta position being based on the potential position having a highest XOR sum.

12. The device of claim 11, wherein at least some of the light received by the detector is from the substance.

13. The device of claim 12, wherein at least some of the light detected by the detector is from an optical code on the substrate.

14. The device of claim 11, wherein the memory stores delta signals from the pen processor, whereby the delta signals can be retrieved from the memory and processed by a handwriting recognition module to render signals representing alpha-numeric characters.

15. The device of claim 14, further comprising a contact sensor supported by the body, the contact sensor outputting a contact signal representative of whether the writing tip is positioned against the substrate, wherein the pen processor selectively sends delta signals to the memory based at least in part on the contact signal.

16. The device of claim 13, wherein the optical codes detectable by the detector represent at least positions, the detector outputting at least one code signal in response to detecting an optical code for determining an absolute position of the writing tip.

17. The device of claim 10, wherein when the contact signal indicates the writing tip is positioned against the substrate and the confidence threshold is reached, a delta signal is generated every cycle and a key frame is imaged and stored upon the detection of pen up and pen down events.

18. The device of claim 17, wherein when the contact signal indicates the writing tip is positioned against the substrate and the confidence threshold is not reached for a low confidence cycle, a key frame is imaged and stored in the memory onboard the body for the low confidence cycle.

19. The device of claim 10, further comprising a host processor receiving signals from the pen processor and accessing a library of optical patterns to determine a type of optical pattern on the substrate.

20. A computer-implemented method for digitizing strokes of a writing tip across a substrate, comprising:
detecting light from a substrate each cycle period;
comparing a frame of light received from the substrate in a second cycle to a frame of received light in a first cycle immediately preceding the second cycle to generate a delta signal;
occasionally but not every cycle generating at least one key frame;
storing the key frames and selectively storing delta signals in memory in a pen body associated with the writing tip;
transferring the key frames and delta signals to a host processor; and
using the host processor to correlate the delta signals and key frames to a digital representation of writing input, wherein when a confidence threshold is reached as defined by a comparison between the frame of light received in the first cycle and the frame of light received in the second cycle, storing a delta signal in the memory in the pen body when the contact signal indicates the writing tip is positioned against the substrate, and otherwise storing the delta signal in a local memory.

21. The method of claim 20, further comprising, at the host processor, accessing a library of bar codes to determine, using at least one key frame, whether a bar code is on the substrate.

22. The method of claim 21, wherein the method includes, if a bar code is on the substrate, using bar codes in key frames to determine absolute writing tip position.

23. The method of claim 20, wherein delta signals are generated by executing a bitwise XOR of at least a subset of a current frame of pixels against a previous frame of pixels at plural potential positions, a delta position being based on the potential position having a highest XOR sum.

24. The method of claim 23, further comprising detecting light from a substance deposited from the writing tip onto the substrate.

25. The method of claim 24, further comprising outputting a contact signal representative of whether the writing tip is positioned against the substrate, and selectively sending delta signals to the memory in the pen body based at least in part on the contact signal.

26. The method of claim 20, further comprising, when the contact signal indicates the writing tip is positioned against the substrate and the confidence threshold is reached, generating a delta signal every cycle and imaging and storing a key frame only once every "N" cycles, wherein "N" is an integer greater than one.

27. The method of claim 26, further comprising, when the contact signal indicates the writing tip is positioned against the substrate and the confidence threshold is not reached for a low confidence cycle, imaging and storing a key frame for the low confidence cycle.

28. The method of claim 20, wherein when the contact signal indicates the writing tip is positioned against the substrate and the confidence threshold is reached, a delta signal is generated every cycle and a key frame is imaged and stored at least upon detection of pen up and pen down events.

29. The method of claim 28, wherein optical codes are detected to represent at least positions, the method including outputting at least one code signal in response to detecting an optical code for determining an absolute position of the writing tip.

30. The method of claim 20, wherein the digital representation of writing input is selected from among the group including: bitmap, vector, and alpha-numeric character representation.

* * * * *